United States Patent [19]

Nishioka et al.

[11] Patent Number: 4,669,002
[45] Date of Patent: May 26, 1987

[54] MULTIPLE MAGNETIC HEAD ROTARY TRANSDUCER DRUM FOR SIMULTANEOUS RECORDING AND REPRODUCING

[75] Inventors: Toru Nishioka, Kakuda; Tatsumaro Yamashita, Funaoka, both of Japan

[73] Assignee: Alps Electric Co., Ltd., Japan

[21] Appl. No.: 688,010

[22] Filed: Dec. 31, 1984

[30] Foreign Application Priority Data

Dec. 31, 1983 [JP] Japan ............................ 58-201493[U]

[51] Int. Cl.$^4$ .......................... G11B 5/09; H04N 5/782
[52] U.S. Cl. ........................................ 360/64; 360/84; 360/31
[58] Field of Search ....................... 360/64, 53, 55, 31, 360/84, 107

[56] References Cited

U.S. PATENT DOCUMENTS

| | | | |
|---|---|---|---|
| 3,051,777 | 8/1962 | Lemelson | 360/72.1 X |
| 3,457,557 | 7/1969 | Storey | 360/64 |
| 4,197,562 | 4/1980 | Kikuya et al. | 360/64 X |
| 4,389,680 | 6/1983 | Gramling | 360/84 X |
| 4,480,274 | 10/1984 | Coleman, Jr. | 360/31 |
| 4,535,367 | 8/1985 | Kanda | 360/84 X |

FOREIGN PATENT DOCUMENTS

| | | | |
|---|---|---|---|
| 59-119583 | 7/1984 | Japan | 360/31 |
| 1185010 | 3/1970 | United Kingdom | |

*Primary Examiner*—Raymond F. Cardillo
*Assistant Examiner*—Alyssa H. Bowler
*Attorney, Agent, or Firm*—Guy W. Shoup

[57] ABSTRACT

A magnetic recorder/reproducer includes a rotary drum supporting first and second playback heads and first and second recording heads for reading information from and writing information in a tape running obliquely to a plane in which the heads rotate, the first playback head, the first recording head, the second playback head, and the second recording head being arranged in the order named in a direction in which the heads rotate, the recording heads being positioned on the rotary drum at a height different from the height at which the playback heads are positioned on the rotary drum, the arrangement being such that while information recorded in a given track on the tape is being reproduced by the ith (i=1, 2) playback head, information is recorded on the same track by the ith recording head. The recording and playback heads are switched over each time the rotary drum makes a half rotation at switching timings that are $\pi/2$ out of phase.

4 Claims, 10 Drawing Figures

MULTIPLE MAGNETIC HEAD ROTARY TRANSDUCER DRUM FOR SIMULTANEOUS RECORDING AND REPRODUCING

BACKGROUND OF THE INVENTION

The present invention relates to a magnetic recorder/reproducer such as a video tape recorder (VTR), and more particularly to a magnetic recorder and reproducer capable of recording information on a track while reproducing other information recorded on the same track.

Video tape recorders (VTRs) have a rotary drum on which two recording/reproducing heads are mounted. The VTR operates by switching the heads each time the rotary drum makes half a revolution in a recording or playback mode while causing a video tape to run inclined to a plane in which the heads rotate, for enabling the heads to record information successively along tracks (known as video tracks) or read information recorded on the tracks to display it on a cathode-ray tube.

There is an instance where the user wants to record another video image (referred to as a program Y) while a video image (referred to as a program X) recorded on a video tape is being reproduced. Such a process has been effected in a conventional VTR by interrupting the playback mode, recording the program Y on another tape, and then reproducing the program X again. Where the sequence in which the programs are viewed is fixed, or the program X has to be viewed at a certain time without fail, however, the above requirement cannot be met with a single VTR, but two VTRs must be shown.

There is another instance where character information created by a computer, for example, is desired to be recorded on a reproduced video image while the video image is being monitored. However, such a requirement cannot conventionally be met with a single VTR, but two VTRs and two video tapes, at least, must be used.

SUMMARY OF THE INVENTION

It is an object of the present invention to provide a magnetic recorder/reproducer capable of recording other information on a track on a given tape while reproducing information recorded on the track.

According to the present invention, there is provided a magnetic recorder/reproducer comprising a rotary drum supporting first and second playback heads and first and second recording heads for reading information from and writing information in a tape running obliquely to a plane in which the heads rotate. The first playback head, the first recording head, the second playback head, and the second recording head are arranged in the order named in a direction in which the heads rotate and, the recording heads are positioned on the rotary drum at a height different from the height at which the playback heads are positioned on the rotary drum. This arrangement allows information recorded on a given track on the tape to be reproduced by the ith (i=1, 2) playback head, while information is recorded on the same track by the ith recording head. The recording and playback heads are switched over each time the rotary drum makes a half rotation at switching timings that are $\pi/2$ out of phase.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1A:
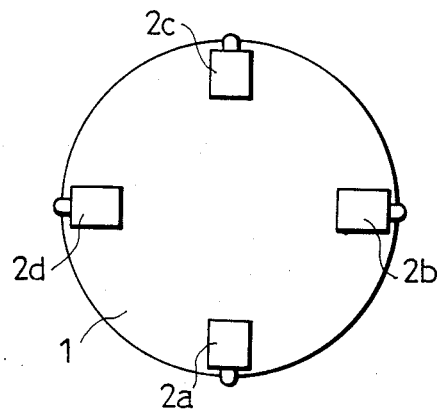
FIG. 1(A) is a plan view of a rotary drum on which heads are mounted.
Figure 1B:
FIG. 1(B) is a schematic view showing the heads as developed horizontally.
Figure 2:
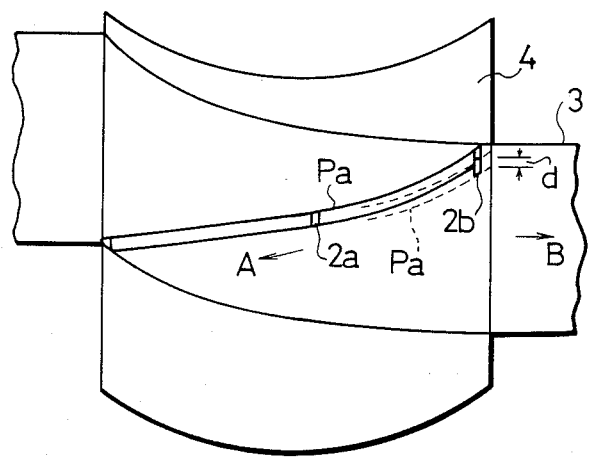
FIG. 2 is a schematic view illustrating the relationship between the direction of travel of a video tape and a plane in which the heads rotate.
Figure 3:
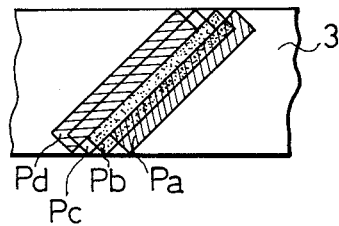
FIG. 3 is a diagram showing tracing patterns of the heads as they are positioned at the same height.

As shown in FIGS. 1(A) and 1(B), a circular rotary drum 1 supports thereon a first playback head 2a, a first recording head 2b, a second playback head 2c, and a second recording head 2d arranged in the order named in a direction in which the rotary drum 1 rotates and angularly spaced at $\pi/2$ (=90°). Each of the playback heads is designed solely for playing back recorded information, and each of the recording heads is designed solely for recording information. The first and second recording heads 2b, 2d are positioned at a height different from the height at which the first and second playback heads 2a, 2c are positioned for the following reasons: If all of the heads were positioned at the same height, and a video tape 3 were running in the direction of the arrow B (FIG. 2) around a cylinder 4 at an angle to a plane in which the heads rotate while the rotary drum or the heads 2a–2d were rotating in the direction of the arrow A, the heads 2a –2d would have tracing patterns Pa, Pb, Pc, Pd, respectively. With the first and second recording heads 2b, 2d and the first and second playback heads 2a, 2c being located at the same height, therefore, the tracing patterns of the recording heads would not coincide with the tracing patterns of the playback heads, but would be displaced ½ track pitch. Where the first and second recording heads 2b, 2d are positioned slightly lower than the first and second playback heads 2a, 2c, the tracing patterns of the playback heads coincide with the tracing patterns of the recording heads. More specifically, the tracing pattern of the first playback head 2a is moved to the dotted-line position shown in FIG. 2 after the rotary drum has rotated 90°. By reducing the height of the first recording head 2b a distance d below the height of the first playback head 2a, the first recording head 2b arrives at a position directing above the tracing pattern Pa (shown by the dotted lines) of the first recording head 2b after the rotary drum has rotated 90°, and then traces the tracing pattern Pa.

As described above, the first playback head 2a, the first recording head 2b, the second playback head 2c, and the second recording head 2d are mounted on the rotary drum 1 at angular intervals of 90° and arranged in the order named in the direction of rotation of the rotary drum 1, and the first and second recording heads and the first and second playback heads are positioned at different heights. With this arrangement, the tracing patterns of the ith (i=1, 2) playback heads 2a, 2c are followed or traced by the ith (i=1, 2) recording heads 2b, 2d with a phase delay of $\pi/2$. Therefore, by switching over the first and second playback heads 2a, 2c and the first and second recording heads 2b, 2d each time the rotary drum 1 makes a half rotation, and delaying a switching timing for the recording heads a ¼ rotation from a switching timing for the playback heads, other information can be recorded on the ith video track (i=1, 3, 5, . . . ) by the first recording head 2b while information recorded on the ith video track is being reproduced by the first playback head 2a, and other information can be recorded on the (i+1)th video track by the second recording head 2d while information recorded on the (i+1)th video track is being reproduced by the second playback head 2c.

Figure 4A:
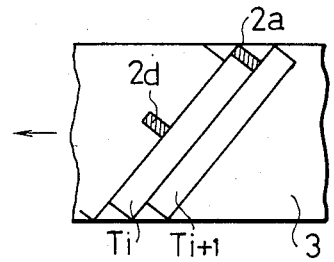
FIGS. 4(A) through 4(E) are diagrams showing the manner in which information is recorded by a magnetic recorder/reproducer according to the present invention.
Figure 4B:
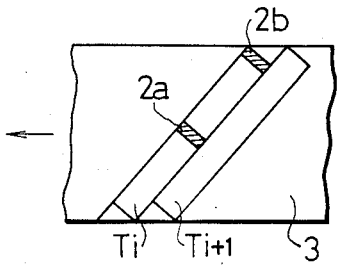
Figure 4C:
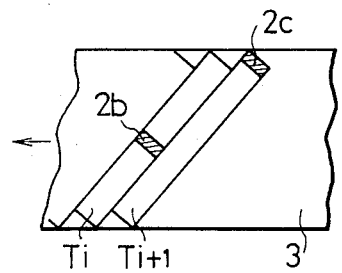
Figure 4D:
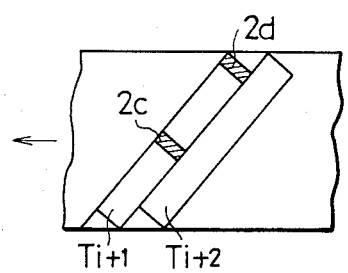
Figure 4E:
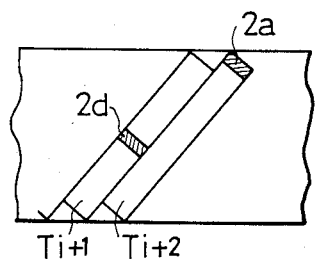

FIGS. 4(A) through 4(E) are illustrative of the manner in which information is thus reproduced and recorded. At an initial stage, as shown in FIG. 4(A), the first playback head 2a is positioned at the beginning end of the ith video track Ti. When the rotary drum 1 has rotated 90° or made a ¼ rotation, the first playback head 2a reaches an intermediate position on the ith video track Ti while reproducing recorded information, and the first recording head 2b arrives at the beginning end of the ith video track Ti, as shown in FIG. 4(B). As the rotary drum 1 further rotates 90°, the ith video track Ti has been played back by the first playback head 2a as illustrated in FIG. 4(C), the first recording head 2b reaches the intermediate position on the ith video track Ti while recording information thereon, and the second playback head 2c reaches the beginning end of the (i+1)th video track Ti+1. Upon a successive ¼ rotation of the rotary drum 1, as shown in FIG. 4(D), the information has been recorded on the ith video track Ti by the first recording head 2b, the second playback head 2c reaches an intermediate position on the (i+1)th video track Ti+1 while reproducing recorded information, and the second recording head 2d reaches the beginning end of the (i+1)th video track Ti+1. When the rotary drum 1 makes a full rotation, as shown in FIG. 4(E), the information on the (i+1)th video track Ti+1 has been reproduced by the second playback head 2c, the second recording head 2d reaches the intermediate position on the (i+1)th video track Ti+1, and the first playback head 2a reaches the beginning end of the (i+2)th video track Ti+2. The above reproducing and recording cycle will hereinafter be repeated.

Figure 5:
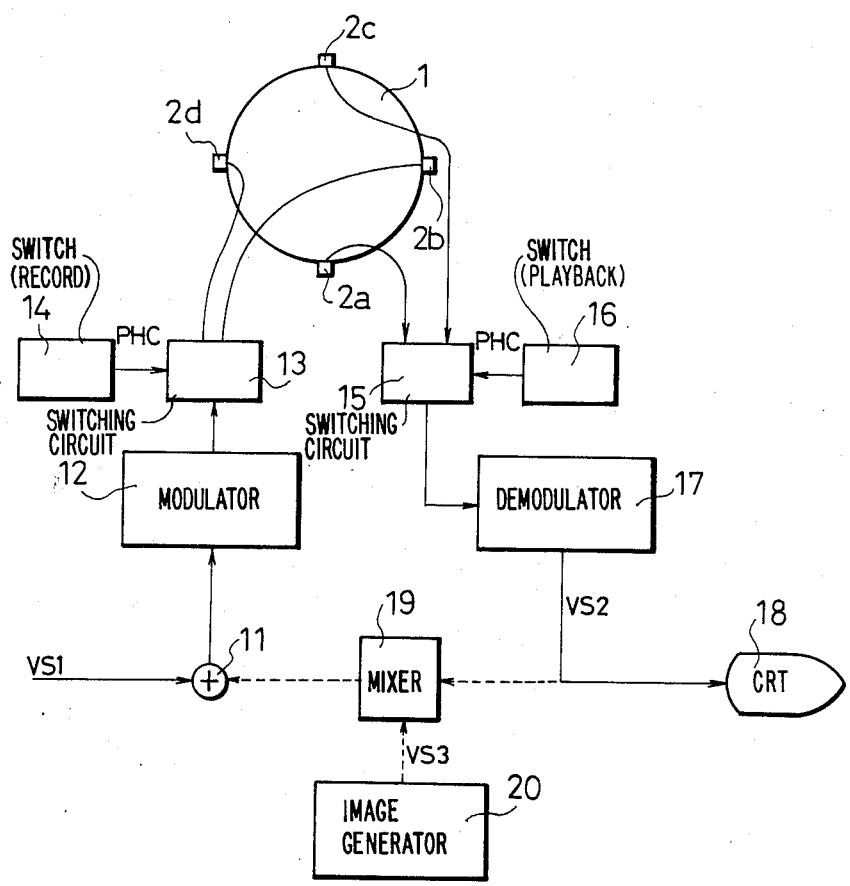
FIG. 5 is a block diagram of the magnetic recorder/reproducer of the present invention.

FIG. 5 shows in block form a magnetic recorder/reproducer according to the present invention. Identical parts in FIG. 5 are denoted by identical reference characters in FIGS. 1(A) and 1(B). A video signal VS1 is applied through an adder circuit 11 to a modulator unit 12 in which the signal is frequency-modulated and amplified for recording. The signal from the modulator unit 12 is applied to a switching circuit 13, which is responsive to a head switching siganl RHC generated by a recording head swithcing unit 14 for applying an output signal alternately to the first and second recording heads 2b, 2d each time the rotary drum 1 makes a half rotation. As a result, the first and second recording heads 2b, 2d record the frequency-modulated video signal alternately on the ith video track Ti (i=1, 2, . . . ) and the (i+1)th video track Ti+1.

A video signal read by the playback heads 2a, 2c from the video tracks Ti, Ti+1 and frequency-modulated is applied to a switching circuit 15. The switching circuit 15 is responsive to a head switching signal PHC generated by a playback head switching unit 16 for applying the signal read by the first and second playback heads 2a, 2c to a demodulator unit 17 each time the rotary drum 1 makes a half rotation. The switching timing for the playback heads is $\pi/2$ (equal to the ¼ rotation of the rotary drum 1) earlier than the switching timing for the recording heads. The head switching signals RHC, PHC are generated by detecting the positions of magnet pieces (not shown) on the rotary drum 1 with pickup coils (not shown). The demodulator unit 17 produces a video signal VS2 by frequency-demodulating and otherwise processing the applied signal, and applied the video signal VS2 to a cathode-ray tube 18 for diplaying the signal thereon. As described with reference to FIGS. 4(A) through 4(E), while the video signal recorded on the video track Ti is being reproduced by the first playback head 2a, another video signal can be recorded on the same video track Ti with a phase delay of $\pi/2$ by the first recording head 2b. Likewise, while the video signal recorded on the next video track Ti+1 is being reproduced by the second playback head 2c, another video signal can be recorded on the same video track Ti+1 with a phase delay of $\pi/2$ by the second recording head 2d.

The magnetic recorder/reproducer of the invention also includes a mixer 19 and an image generator unit 20 for generating images such as characters. The mixer 19 and the image generator unit 20 enable a single VTR to effect a multiplexing mode in which another image such as characters can be recorded additionally on an image which has already been recorded on a video tape. For example, a signal is read from the video track Ti by the first playback head 2a and demodulated by the demodulator unit 17, the demodulated video siganl VS2 is applied to the mixer 19, which is also fed with an image signal VS3 indicative of characters for example which is generated by the image generator unit 20. The mixer 19 mixes the applied signals VS2, VS3, and delivers the mixed signal through the adder circuit 11 to the modulator unit 12. The modulator unit 12 modulates the applied video signal, and writes the modulated video signal on the video track Ti through the first recording head 2b. Then, character information is overlapped on a signal read from the next video track Ti+1 by the second playback head, and the combined video signal is written on the same video track Ti+1 by the second recording head 2d. The above reproducing, mixing, and recording cycle is thereafter repeated to record character-multiplexed images on the video tape.

With the arrangement of the present invention, there are employed two playback heads and two recording heads, and the recording heads can trace tracing patterns of the playback heads. As a consequence, other information can be written on a track while information is being reproduced from the same track. Another image (such as characters) can be overlapped or multiplexed on an image which has already been recorded. Therefore, the VTR has a greater functional capability for a wider range of playback modes.

Although a certain preferred embodiment has been shown and described, it should be understood that many changes and modifications may be made therein without departing from the scope of the appended claims.

What is claimed is:

1. A magnetic recorder/reproducer for simultaneously reproducing previously recorded information while recording new or superimposed information on the same track of a moving magnetic tape medium comprising:

a rotary transducer drum rotatable about an axis and supporting first and second playback heads and first and second recording heads for reproducing information from and recording information on successive tracks of the magnetic tape medium, said heads being alternately located at points on a peripheral surface of the drum and rotating with said drum substantially in a plane thereof, said magnetic tape medium running in a downstream direction at an oblique angle relative to said plane of rotation in contact with said peripheral surface and said magnetic heads of said transducer drum;

wherein said magnetic heads are arranged on said rotary drum in the order of contact with the magnetic tape medium of said first playback head, said first recording head, said second playback head, and said second recording head, wherein said playback heads are positioned at a different height of the rotary drum relative to said recording head, in correspondence with said magnetic tape medium running at said oblique angle, such that while previously recorded information is being reproduced in a downstream location on a given track of the magnetic tape medium by a playback head, new or superimposed information can be simultaneously recorded in an upstream location on the same track by a following recording head.

2. A magnetic recorder/reproducer according to claim 1 adapted for use in a video tape recorder including an image generator unit for generating signals representing images, such as characters, and a mixer, wherein a playback head reproduces recorded information downstream from a track of the magnetic tape medium, said reproduced information is combined with said image signals superimposed thereon by said mixer, and the combined information is recorded upstream on the same track by the following recording head.

3. A magnetic recorder/reproducer according to claim 1, wherein said heads are angularly spaced with phase differences of $\pi/2$.

4. A magnetic recorder/reproducer according to claim 3, including a first switching circuit for switching over said recording heads each time the rotary drum makes a half rotation, and a second switching circuit for switching over said playback heads each time the rotary drum makes a half rotation, the switching timing for said recording heads being $\pi/2$ out of phase with the switching timing for the playback heads.

* * * * *